United States Patent [19]

Lirones

[11] 4,160,796

[45] Jul. 10, 1979

[54] MELTING FURNACE CONSTRUCTIONS

[75] Inventor: Nick G. Lirones, North Muskegon, Mich.

[73] Assignee: Howmet Turbine Components Corporation, Muskegon, Mich.

[21] Appl. No.: 847,262

[22] Filed: Oct. 31, 1977

[51] Int. Cl.$^2$ .................................. C04B 33/34

[52] U.S. Cl. .................................. 264/60; 264/220; 264/250; 266/242; 266/275

[58] Field of Search .................. 13/26, 27, 32, 35; 264/60, 220, 250; 266/242, 275, 276; 432/156–158, 262–265

[56] References Cited

U.S. PATENT DOCUMENTS

| | | | |
|---|---|---|---|
| 1,540,515 | 6/1925 | Cuenot | 432/156 |
| 1,655,983 | 1/1928 | Brace | 13/27 |
| 3,328,017 | 6/1967 | Conner | 432/264 |
| 3,401,227 | 9/1968 | Dunlevy et al. | 13/26 |
| 3,998,264 | 12/1976 | Hocking | 266/242 |

*Primary Examiner*—Gerald A. Dost

*Attorney, Agent, or Firm*—McDougall, Hersh & Scott

[57] ABSTRACT

Melting furnace constructions for the melting of ingots, the constructions including crucibles and insulating means for the crucibles. The insulating means serve to separate the charge from the heating means for the construction. The ingots employed are maintained out of contact with the crucible side walls and the crucibles define bottom surfaces which include means for maintaining substantial portions of the ingot bottoms out of contact with the crucible bottom. This arrangement minimizes heat exchange between the charge and the crucible to minimize thermal shock. The crucible is also preferably provided with a capsule of ceramic material cast around the crucible. The capsule and crucible combination is inserted within a liner with the adjacent capsule and liner surfaces substantially conforming whereby ideal support and strength for the combination is accomplished.

7 Claims, 5 Drawing Figures

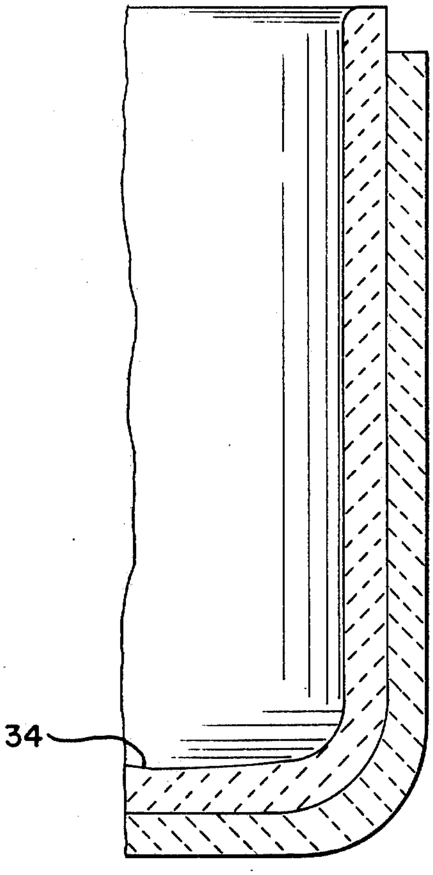
FIG. 3
FIG. 4
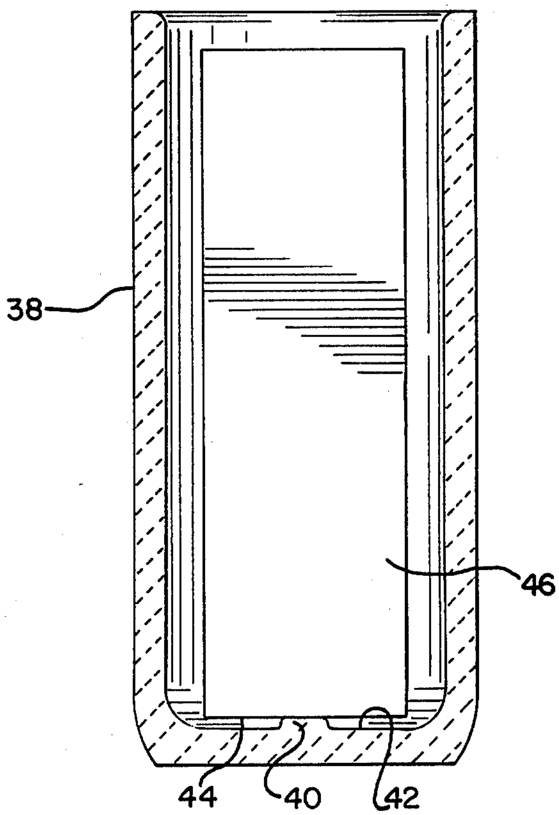
FIG. 5
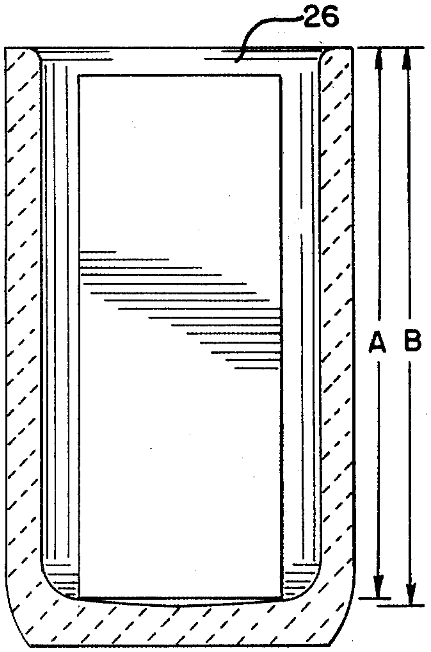

MELTING FURNACE CONSTRUCTIONS

BACKGROUND OF THE INVENTION

This invention generally relates to furnace constructions utilized for the melting of ingots and other metal charges. The invention is particularly concerned with melting crucibles utilized in such constructions and with a method for the production of such crucibles.

The costs incurred in the melting of metal charges are greatly influenced by the efficiency of the systems employed particularly in view of the cost of energy. Another major factor in determining such costs is the life of the constructions utilized. Thus, the fact that elevated temperatures are involved tends to accelerate deterioration of furnace constructions, and the problem becomes most acute in the melting of high-melting point materials.

Ceramic melting crucibles are widely employed in the melting of high-melting point alloys including iron, cobalt and nickel base alloys. Such crucibles can withstand the temperatures involved, however, the crucibles are subject to deterioration and periodic replacement is necessary.

In the furnace constructions employing melting crucibles, the crucibles are usually surrounded by packing and liners which separate the crucibles from the heating elements of the construction. Specifically, prior art systems may provide induction heating coils which are embedded within a ceramic liner. In the utilization of this arrangement, a granular ceramic packing is located within the liner with the crucible being received within the packing. The packing and the ceramic mud or the like forming a liner for the construction thus serve as barriers between the crucible and the heating elements. In the event of cracking of the crucible, the barrier acts to prevent the passage of molten material into contact with the heating elements.

The described prior art arrangement tends to be inefficient since a new packing operation must be undertaken each time a crucible is changed. This is a time-consuming operation which contributes to the expense of the melting process. Furthermore, the presence of the granular packing material can also lead to contamination problems which are highly critical when the material being melted is to be utilized in applications requiring parts of the highest integrity.

Prior art crucible designs are also inefficient when the designs utilized for the casting of superalloys are considered. Such crucibles tend to be inefficient for melting purposes, particularly in view of the heat transfer relationship between an ingot charge and the crucible.

FIG. 1 of the drawings illustrates a prior art arrangement of the type described. This construction includes a melting crucible 10 supporting a solid ingot 12. A particulate insulating material 14 is tightly packed around the crucible 10, and an annular cap 16 serves to hold the packing material in place. The packing material is pressed between the interior wall of liner 18 and the wall of the crucible 10.

The liner 18 has induction heating means 20 embedded therein. In accordance with this invention, the ingot 12 is adapted to be located within the crucible for exposure to the heating means. The induction coils are adapted to melt the ingot, and after the melting has been concluded, the entire assembly may be tipped about the trunnions 22 for pouring of the molten metal into casting molds or the like. The cap 16 is designed to prevent the loss of particulate material during such an operation. Since the crucible 10 will gradually deteriorate, it must be periodically replaced, and this necessitates removal of cap 16 and repacking of the packing material after a new crucible is put into position.

SUMMARY OF THE INVENTION

This invention generally involves a melting crucible construction for use in a melting furnace wherein a charge to be melted can be located in ingot form in the crucible. The crucible defines a bottom for supporting the ingot, and heating means associated with the furnace operate to melt the ingot. The crucible is formed with means such as a curved bottom or a button element which serve to hold substantial portions of the ingot bottom in spaced relationship with the crucible bottom whereby heat transfer between the ingot and crucible is minimized. Thus, the crucible design is such that a space is defined between the side walls of the crucible and the sides of the ingot and also between a substantial area of the bottom of the ingot and the bottom wall of the crucible. By minimizing the conduction of heat between engaging surfaces of the ingot and crucible, less thermal shock is imposed on the crucible bottom thereby increasing crucible life.

The invention also relates to improvements in the production of crucibles whereby the crucibles can be efficiently employed in furnace constructions without the necessity for use of granular packing material around the crucible. More specifically, the heating means of the furnace are provided with an adjacent ceramic liner for separating the heating means from the crucible. This liner may comprise a ceramic mud having induction coils or the like embedded therein or the induction coils or other heating means may surround the liner.

This invention contemplates the casting of a ceramic capsule around the crucible used for supporting the ingot to be melted. The capsule is produced in a mold which supports the crucible and which also has interior dimensions corresponding with the interior dimensions of the liner. Accordingly, after the capsule has been cast, it will be in intimate contact with the exterior of the crucible. Furthermore, when the capsule and crucible are located within the liner, the exterior of the crucible will closely conform with the interior of the liner. This relationship between the crucible, capsule and liner provides for maximum support for the crucible. Specifically, a strong assembly is achieved and crucible life is improved due to minimizing of thermal shock and the reduction in cracking which could result.

In accordance with the preferred form of the invention, the crucibles are formed by a process involving the application of isostatic pressure to ceramic particles located around a core. The pressure application results in the formation of a crucible having interior dimensions corresponding with the core. The exterior dimensions of the crucible are, however, somewhat irregular in view of the fact that the isostatic pressure application will not necessarily provide a crucible with completely smooth exterior surfaces.

By casting a capsule around the exterior of the crucible, close conformance of the crucible and capsule is assured. By utilizing a mold for the casting which has interior dimensions corresponding with the liner interior dimensions, a smooth exterior surface will be defined by the capsule, and the capsule and crucible can then be snugly fit within the liner.

BRIEF DESCRIPTION OF THE DRAWINGS

FIG. 3 is an enlarged fragmentary, cross-sectional view illustrating a capsule cast around a crucible;

FIG. 4 is a cross-sectional view illustrating one form of crucible construction in accordance with this invention; and, FIG. 5 is a cross-sectional view illustrating an alternative form of crucible construction in accordance with this invention.

DESCRIPTION OF THE PREFERRED EMBODIMENTS

Figure 1:
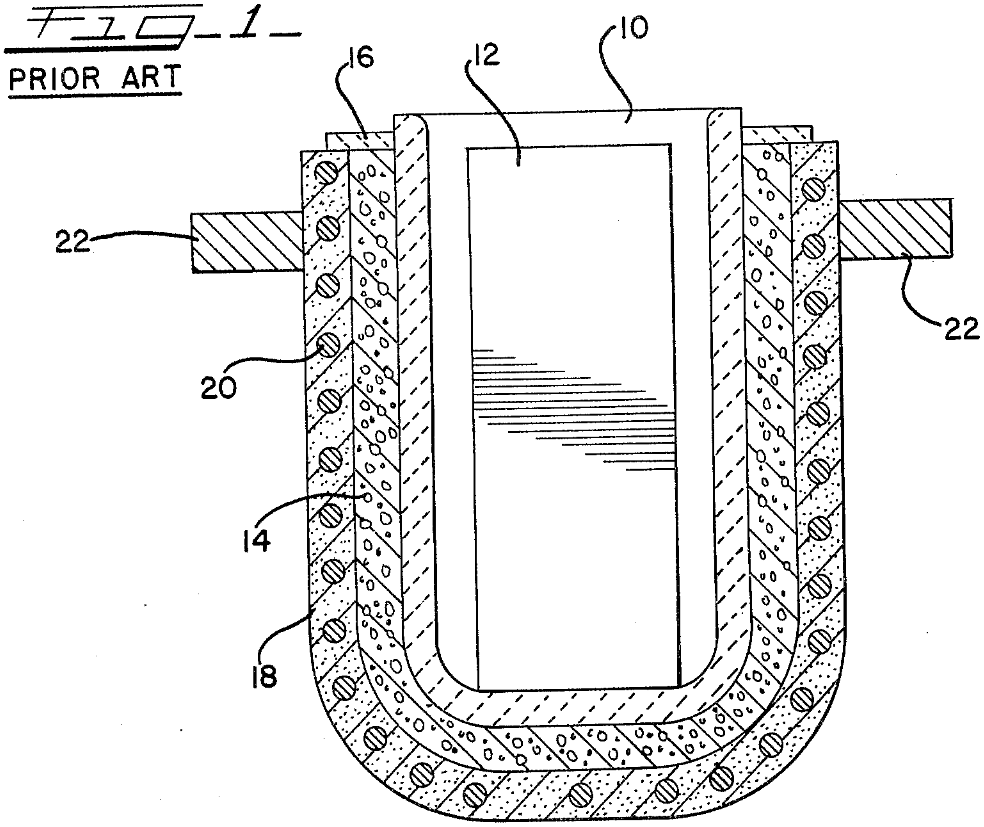
FIG-1- PRIOR ART
FIG. 1 is a vertical, cross-sectional view illustrating a capsule and associated liner and packing materials as utilized in accordance with prior art teachings.
Figure 2:
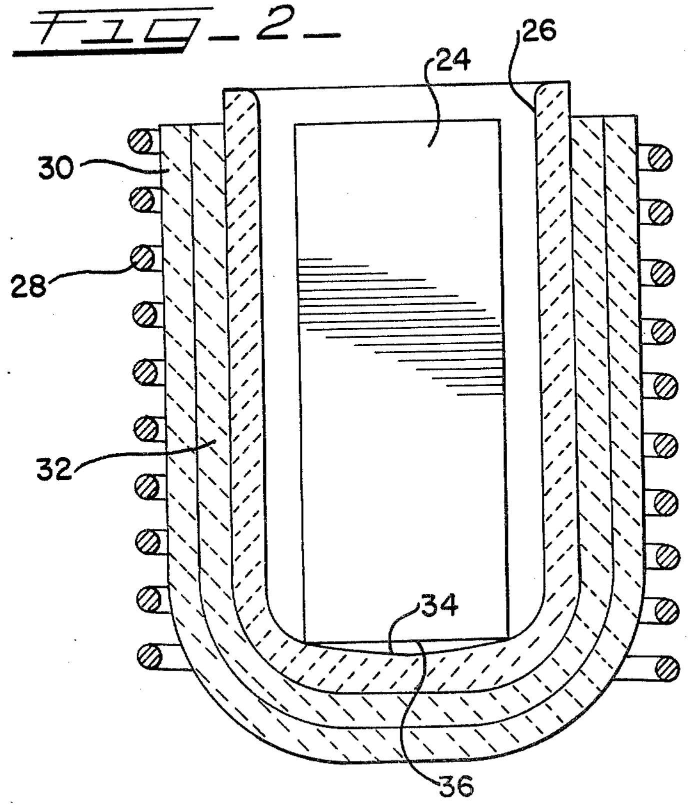
FIG. 2 is a cross-sectional view illustrating a crucible and capsule combination within a liner in accordance with the practice of this invention.

FIG. 2 of the drawings illustrates an improved arrangement for achieving the melting of a solid ingot 24. This ingot is located within crucible 26, and induction coils 28 are provided for supplying the energy for melting. It will be understood that the invention contemplates the utilization of various heating means. In addition, the induction coils may be located in surrounding relationship relative to the crucible and other structures as shown in FIG. 2, or the invention may be practiced in a system wherein the induction coils are embedded as shown in FIG. 1.

A refractory liner 30 is utilized for separating the induction coils from the crucible, this liner serving as a barrier in the event of any conditions which would tend to cause the passage of molten metal toward the induction coils. In a typical construction, the liner 30 comprises aluminum silicate fired in a conventional fashion. In the typical situation, the crucible 26 will be formed by introducing a granular zirconia or other ceramic material around a core disposed within a rubber mold. Such systems involve the application of isostatic pressure for the formation of the ceramic crucible, and this results in a crucible interior comprised of smooth faces precisely conforming with the core configuration. The ceramic compact is adapted to be dried and fired in conventional fashion to achieve an acceptable crucible.

Crucibles formed in rubber molds under isostatic conditions define relatively irregular outer surfaces. Thus, the core employed insures a smooth interior surface; however, the molding conditions, including the flexibility of the rubber, result in irregular exterior surfaces.

The condition of the exterior surface of a crucible is not of consequence when the prior art system shown in FIG. 1 is utilized in a melting operation. Thus, the ceramic packing 14 will necessarily conform closely with the exterior surface whereby the irregularities are readily accommodated. Similarly, the packing will provide close conformance with the interior of the liner 18 in the prior art.

Since the exterior surface irregularities in a crucible 26 will vary, a liner of the type shown at 30 which is simply increased in size for purposes of eliminating the use of packing 14 will not provide desired support for the crucible. This invention avoids the problem since the capsule 32 is cast around the crucible 26 to enable the encapsulated crucible to exactly fit into the liner 30. This eliminates the intermediate packing material 14 used by the prior art and improves crucible life because thermal shock is minimized.

In accordance with this invention, a capsule 32 is cast around the crucible 26 subsequent to formation of the crucible. Thus, a slurry of ceramic material, for example aluminum silicate, is introduced into a mold with the crucible 26 forming a core in the mold. The interior mold surfaces conform with the interior surfaces of the liner 30. When the capsule has been dried and fired in accordance with conventional practice, there results a combination of a crucible and capsule having a precisely conforming interface. Furthermore, when this combination is located within the liner 30, close conformance with the liner interior surface is achieved.

It will be appreciated that the arrangement of FIG. 2 provides distinct advantages over the arrangement of FIG. 1. The step of including a granular ceramic packing is completely eliminated, this step involving simply the location of a crucible and capsule combination within the liner 30. Similarly, when a crucible requires replacement, the crucible and capsule combination is simply pulled out, and a new combination located in place. The disposal of packing material and provision of new packing material is completely avoided.

The arrangement of FIG. 2 also eliminates contamination problems which can occur when loose packing material is located in the vicinity of molten metal. Thus, the handling of the capsule and crucible combination does not involve any tendency toward the introduction of foreign particles into the metal bath.

FIGS. 2 and 3 also illustrate one preferred form for a crucible design. It will be noted in particular that only the edges of ingot 24 engage the bottom surface 34 of the crucible.

Substantially all of the ingot bottom 36 is out of contact with the crucible bottom. Similarly, the respective side walls of the ingot and crucible are out of contact. The arrangement of FIGS. 2 and 3 has been found to significantly improve the life of crucibles through reduced thermal shock, particularly when repeatedly melting superalloy ingots.

It is believed that this occurs because there is a substantially reduced tendency for heat transfer between ingot surfaces and the crucible walls. This is in contrast to an arrangement of the type shown in FIG. 1 wherein substantially complete contact between the ingot bottom and crucible bottom will tend to create a heat transfer condition significantly different than occurs between the respective side walls which are out of contact.

FIG. 4 illustrates a modified form of the invention wherein the crucible 38 defines a button 40 extending upwardly from bottom wall 42. This arrangement thus maintains substantially all of the bottom surface 44 of ingot 46 out of contact with the surface 42.

In a typical example of the practice of this invention, a crucible is formed under isostatic pressure in a rubber mold using zirconia granules. The crucible was 9.825 inches in height with an outer diameter of 4.6 inches. The inner diameter of the crucible was 3.8 inches at the top and defined a slight taper to 3.7 inches at the bottom.

In the case of a structure such as shown in FIG. 4, a button $\frac{1}{2}$ inch in diameter and $\frac{1}{8}$ inch in height was formed in the bottom surface of the crucible. FIG. 5 illustrates crucible 26 having a concavity in the bottom wall. In a typical example, the dimension A for this crucible is 7.258 inches, the dimension B 7.316 inches. In this example, the crucible height was 7.8 inches and the outer diameter was 4.6 inches.

The above referenced dimensions can vary while still achieving the objects of the invention. It is contemplated that button heights of from 1/16 to 1 inch will be suitable with the button cross-sectional area varying between 5 and 20 percent of the cross-sectional area of the ingot bottom. It will be understood that the button arrangement could involve the provision of two or more buttons located in spaced relationship on the crucible bottom.

The degree of concavity in the crucible bottom may be measured by a consideration of the dimensions A and B. It is contemplated that the dimension A may vary from 99.5 to 95 percent of the dimension B.

Capsules of aluminum silicate can be effectively used around zirconia crucibles. In order to insure the highest integrity for the crucible, drying and firing of the crucible can take place as a separate procedure, for example at temperature of 2950° F. for two hours. The aluminum silicate or other ceramic cast around the crucible can then be separately dried and fired under the same or other suitable conditions. It is contemplated, however, that the capsule could be cast around a crucible in the green state with drying and firing taking place simultaneously. This is particularly advantageous where the crucible and capsule are of the same material or are compatible from the standpoint of thermal expansion characteristics.

The capsule is preferably cast to be at least the wall thickness of the crucible. Similarly, the liner 30 should be of at least the same wall thickness. It will be appreciated that the dimensions contemplated are in line with dimensions already employed in prior art systems such as illustrated in FIG. 1.

It will be understood that various changes and modifications may be made in the above described construction which provide the characteristics of the invention without departing from the spirit thereof particularly as defined in the following claims.

That which is claimed is:

1. A method for producing a crucible for use in melting a charge in a melting furnace, said furnace having heating means surrounding the crucible for melting the charge, and insulating means separating the crucible from the heating means, the insulating means including a ceramic liner adjacent said heating means, said method comprising forming said crucible by applying isostatic pressure to ceramic particles surrounding a core whereby the crucible may define an irregular exterior surface, casting a ceramic capsule around said crucible whereby the interior surfaces of the capsule closely conform to and are in contact with the exterior surfaces of said crucible, the casting of the ceramic capsule including the steps of providing a mold having interior dimensions corresponding with the interior dimensions of said liner, locating said crucible in said mold and casting ceramic particles in the mold for thereby forming said capsule around said crucible, the exterior dimensions of said capsule thereby being controlled by the mold configuration with the exterior dimensions of said capsule conforming with the interior dimensions of said liner whereby the capsule and crucible combination is snugly receivable within said liner, and whereby the combination of said capsule and liner provide strong support for said crucible.

2. A method in accordance with claim 1 wherein said capsule is cast around said crucible with a wall thickness at least as great as the wall thickness of said crucible.

3. A method in accordance with claim 2 wherein the wall thickness of said liner is at least as great as the wall thickness of said crucible.

4. A method in accordance with claim 1 wherein said crucible is formed with a button on the bottom surface thereof, said charge being introduced into said crucible in ingot form, said button operating to hold a substantial portion of the bottom of said ingot in spaced relationship with the bottom surface of said crucible.

5. A method in accordance with claim 1 wherein said crucible is formed with a concave bottom surface, said charge being introduced into said crucible in the form of an ingot, said ingot defining a substantially flat bottom surface whereby bottom edges of said ingot contact the bottom surface of said crucible with substantial portions of the ingot being maintained out of contact with said bottom surface.

6. A method in accordance with claim 1 wherein said crucible and capsule are fired to form a matured ceramic structure.

7. A method in accordance with claim 6 wherein said crucible is fired after formation thereof and before casting of the capsule, and the combination of said crucible and capsule are fired subsequent to casting of the capsule.

* * * * *